United States Patent [19]

Horn et al.

[11] Patent Number: 4,620,463
[45] Date of Patent: Nov. 4, 1986

[54] PROCESS FOR MACHINING TUBULAR PARTS AND APPARATUS FOR CARRYING OUT THE PROCESS

[75] Inventors: Laurent Horn, Montrauil Juigné; Jérôme Hautdidier, Avrillé; Christian Soulet, Ugine, all of France

[73] Assignee: Compagnie Europeenne du Zirconium Cezus, Courbevoie, France

[21] Appl. No.: 760,165

[22] Filed: Jul. 29, 1985

[51] Int. Cl.$^4$ ............................ B23B 1/00; B23B 5/08
[52] U.S. Cl. ..................................... 82/1 C; 29/33 T; 82/14 D; 82/20
[58] Field of Search ................ 82/1 C, 2 B, 14 D, 20, 82/21 A; 29/33 T; 51/73 R

[56] References Cited

U.S. PATENT DOCUMENTS

| | | |
|---|---|---|
| 847,426 | 3/1907 | Moll . |
| 2,902,139 | 9/1959 | Brenk et al. . |
| 3,146,646 | 9/1964 | Mucklenbeck et al. ................ 82/20 |
| 3,486,403 | 12/1969 | Schweer et al. ........................ 82/20 |
| 3,532,026 | 10/1970 | Mayer et al. . |
| 3,782,228 | 1/1974 | Lindemann et al. .................... 82/20 |
| 3,817,149 | 6/1974 | Reutlinger ............................... 82/20 |
| 3,834,256 | 9/1974 | Abbatiello et al. ................. 82/21 A |
| 3,851,991 | 12/1974 | Walker .................................. 82/102 |
| 3,899,943 | 8/1975 | Schaller ................................... 82/20 |
| 3,935,766 | 2/1976 | Masters ................................ 82/21 A |
| 4,305,689 | 12/1981 | Yamade et al. ........................ 82/20 |
| 4,424,616 | 1/1984 | Numano et al. .................... 29/33 T |
| 4,494,280 | 1/1985 | Blaimschein .............................. 29/6 |

FOREIGN PATENT DOCUMENTS 1537084 7/1968 France .

Primary Examiner—Francis S. Husar
Assistant Examiner—Jerry Kearns
Attorney, Agent, or Firm—Dennison, Meserole, Pollack & Scheiner

[57] ABSTRACT

Production of a substantially constant wall thickness in every cross section on cylindrical tubular parts produced for example by extrusion and rolling. The process of the invention comprises determining, by means of a suitable apparatus, the position of the center of the internal contour of a cross section of the tubular part, then rotating one with respect to the other a machining tool and the part about the axis of said internal contour and moving the machining tool towards the part until, over the periphery of said cross section, a constant wall thickness which is equal at most to the minimum thickness is obtained, and then repeating those operations on the successive desired sections of the tube, which are parallel to the first section. The invention also concerns the apparatus which is especially adapted for carrying out that process, the apparatus essentially comprising an ultrasonic checking apparatus (3), a machine tool (8) and an apparatus (6) for transfer from the apparatus (3) to the machine tool (8), while maintaining the orientation of the tube about its axis. The invention makes it possible to produce tubular parts with a degree of relative eccentricity in every section which is less than 1% and in particular to improve the quality of the fuel sheathing tubes produced by rolling such tubular parts.

12 Claims, 3 Drawing Figures

PROCESS FOR MACHINING TUBULAR PARTS AND APPARATUS FOR CARRYING OUT THE PROCESS

The field to which the invention relates is that of machining tubular parts.

STATEMENT OF THE PROBLEM

The problem that the present invention seeks to solve is that of producing a wall thickness or gauge which, for any cross section, is constant of at least does not depart from such constant thickness by more than a given amount, on hollow cylindrical parts whose cross sections are of circular internal and external contours, such as seamless tubes.

Such a tube is produced for example by extruding a pierced billet over a mandrel, and then optionally a certain number of rolling passes.

In practice, the internal hole is not perfectly coaxial with the external surface of the part. That means that the thickness of the wall is not the same at every point on the periphery of a cross section. In addition, the regions of minimum thickness at the successive sections of the tube are in positions whose orientation varies along the tube.

A supplementary machining operation is required to remedy that defect.

STATEMENT OF THE KNOWN PRIOR ART

For that purpose, it is known for the tube to be taken between its ends, and rotated about the axis of the internal surface (defined by the centres of its ends) in front of a machining tool which has been previously brought into contact with the external contour of an end section of the part, at the location where the thickness is at a minimum, thereby to correct the eccentricity of that end section. The tool is then displaced parallel to the axis of rotation from one end of the tube to the other, with the tube rotating in order to machine the whole of the external surface. However, in the present situation, that does not make it possible to produce a constant thickness over the entire length of the tube as the regions of minimum thickness at successive cross sections are not located on the same generatrix of the tube.

Preliminary examination of the tube, for example by ultrasonic means, having made it possible to mark in respect of each cross section the region of minimum thickness and the region of maximum thickness, it is then proposed that the tube should be taken between its ends, in known manner, and oriented by rotating it about a longitudinal axis so that the successive regions where the excessive thickness of material has to be removed are presented in front of an abrasive belt.

The disadvantages of that known process are that the contour produced is not circular and that the joins at the ends of the areas where abrasion has taken place are far from being perfect.

In addition, as the magnitude of relative eccentricity (defined here as the ratio of the difference between maximum thickness and minimum thickness to the average of such thicknesses) may vary from one section to another, the axis which serves to orient the tube in front of the abrasive band does not pass through all the centres of the internal contours of the sections of the tube. Accordingly, the machined external contour of a section is not necessarily concentric with respect to the internal contour and there may still be differences in thickness along the periphery of a section.

Finally, it has been proposed in the prior art that the tube should be rotated in front of an untrasonic cell for determining the thickness of the tube at each point of a cross section and in front of a tool whose radial displacement is controlled at any time in dependence on the thickness information produced by the ultrasonic cell.

The assembly of the ultrasonic cell and the tool is displaced at the same time in parallel relationship to the tube so that the tube is explored and machined over its entire surface area, along a helicoidal path. Rotation of the tube is about the axis defined by the centres of its end sections or about the axis of the external surface.

That process makes it possible to impart to the tube a constant thickness or gauge over its entire length, and sometimes even a degree of eccentricity which is theoretically zero, but at the cost of a system for permanently controlling the tool, which is highly complex, and at the cost of removing a very substantial amount of material.

STATEMENT OF THE INVENTION

The process of the invention takes account of all those elements in order to produce a zero degree of eccentricity over the entire length of the tube, to within the desired tolerance, and a constant wall thickness or gauge in each section.

That process comprises determining, for a cross section, on the one hand the position of the ends of the diameter of the external contour going from the point where the wall thickness is at a minimum to the point where the wall thickness is at a maximum (which is referred to as the reference diameter of the section), and on the other hand, the values of said two thicknesses, then determining the position of the centre of the external contour as the middle of the reference diameter and the position of the centre of the internal contour as spaced from the preceding centre by a length equal to half the difference of said maximum and minimum thicknesses in the direction of the point of minimum thickness, with the tube remaining fixed, rotating the machining tool about the axis of the internal contour of the cross section in question, and moving the tool radially towards the surface of the tube to remove material around the periphery of a section of the tube containing said cross section until the wall thickness is equal to the selected constant thickness, said constant thickness being at most equal to the initial minimum thickness. Those operations are then repeated on the successive desired sections of the tube which are parallel to the first section.

The section which is thus machined in consequence of the control procedure which is carried out on the basis of each cross section is thus a thin section of the tube which contains the cross section in question and of a tube length which is usually equal to the cutting width of a tungsten carbide tip, which width is possibly variable with the depth of cut and is typically between 2 and 12 millimeters. The control cross sections and the successive sections machined are displaced relative to each other by a distance equal to the above-mentioned length less an overlap distance which is at most equal to 2 millimeters.

If it is borne in mind that this situation involves a system comprising three elements, namely the tube, the tool and the embodied axis of rotation of the tool, the process of the invention comprises rotating the tool about the axis, without contact with the tube, then transversely displacing the axis by a translatory movement of the assembly (axis-tool) with respect to the fixed tube, and finally displacing the tool to the machining position thereof by radial translatory movement of the tool alone with respect to the assembly (axis-tube). The term embodied axis of rotation of the tool is used to mean in practice the axis of rotation of the device for driving the tool around the tube. It is preferred for the rotary movement of the tool to be begun before its radial positioning in order to produce a less brutal initial machining engagement.

Among the possible alternative forms of the process, the applicants prefer initially to orient the tube by limited rotation through a certain angle about its longitudinal axis, so that the reference diameter of the section in question is positioned in a given position with respect to the system for permitting the transverse translatory movement of the assembly (axis-tool). The tube will then remain in that position during the step of machining the section.

The process begins with a marking and measuring stage on a piece of equipment which is separate from the machining bench. Among the various non-destructuve inspection means, it is preferred to use an ultrasonic device having a plurality of transducers which make it possible continuously to determine the position and the thickness of the tube and therefore to deduce therefrom the minimum and maximum thicknesses as well as the position of the internal and external circles of the successive sections. In that way, for any cross section of abscissa X (measured from a starting section, for example from one end of the tube), that procedure provides for determining the direction and the sense of the oriented reference diameter of the section, going from the point of maximum thickness E to the point of minimum thickness e, and that is marked by means of the angle at which it is disposed relative to the oriented reference diameter of the starting section. The values of the thicknesses e and E are also ascertained.

All those items of information constitute the characteristics of the section in question.

The tube is then transferred to the machining bench, without altering the orientation thereof, for example by means of a transverse translatory movement. Once the tube is on the machining bench, the orientation thereof is altered so that the reference diameter of the first section to be machined is parallel to the direction of transverse translatory movement of the assembly (axistool). The tool, in the position of maximum radial withdrawal, is then driven in rotation about its axis, without being in contact with the fixed tube.

The next step to be carried out is then that of setting the machining bench by displacing the axis of rotation of the tool, perpendicular to the plane of the section in question, until it passes through the centre of the internal contour, which is itself determined with respect to the centre of the external contour, being the middle of the segment joining two sensors which come into contact with the ends of the reference diameter of the section. In the case of a numerically controlled machine tool, all the characteristics of the section which are produced by the ultrasonic equipment are introduced into the memory of the machine and processed by a program which makes it possible firstly to orient the tube and then to position the axis of rotation.

Finally, the tool is progressively displaced in the radial direction to move its cutting edge to the location of the point of minimum thickness of the section of the tube in question, said edge then describing a circle whose centre is the centre of the internal contour of the section while the radius thereof is the radius of the internal contour plus the value of the minimum thickness. The external contour which is machined in that way is concentric with respect to the internal contour and the thickness of the wall is constant in the section in question.

Operation then passes to the following section by longitudinally displacing the tool carrier along the tube and orienting the tube in such a way as to position the reference diameter of the fresh section.

That process permits a simplification in the system for controlling the tool since the tool is controlled in dependence on a single condition in regard to radial position for a given section. On the other hand, the removal of material corresponding to correction of a degree of eccentricity may be reduced to a minimum in each machined section and therefore for the whole of the tube. It is a particularly attractive proposition in regard to thick tubes which are then subjected to a drawing or rolling operation, as that contributes to minimising any irregularities in the surface of the tube, due to the fact that the machining operation was carried out on a section-by-section basis.

The invention also concerns a mode of carrying the process into effect, which involves working on the basis of portions of tube instead or working on a section-by-section basis. The term portion of tube is used to denote a length of tube corresponding to several times the cutting width of the tool.

In fact, it has been found that, within the permitted limits of eccentricity, it is possible further to simplify the system for controlling the tool and to increase the level of productivity of the apparatus for carrying out the process if the tool is controlled in dependence on a single condition in respect of radial position for a portion of tube, that is to say, if the same radial tool position is maintained for a plurality of successive sections, provided that that tool position is suitably selected.

In this alternative form of the process, the applicants provide for attributing the same section (referred to as the guide section) to the entire length of the portion of tube, which length is typically between 10 and 80 millimeters, for controlling the machining bench along that portion of tube.

The characteristics of the above-indicated guide section, which are used by the members of the machining bench, are deduced from the characteristics of the successive sections of the portion by the application of one or more laws of correspondence, so selected that the guide section is very close to the successive sections. This procedure comprises firstly determining, for each of the successive control cross sections, the position of the ends of the reference diameter going from the point where the wall thickness is at a minimum to the point where the wall thickness is at a maximum, as well as the values of such maximum and minimum wall thicknesses, and using such data in order to deduce therefrom the characteristics of the guide section and in order to control machining of the portion of tube, the length of which may be selected in dependence on the tolerances to be satisfied in respect of eccentricity and the magnitude of the variations in the degree of eccentricity along the tube before machining. For the purposes of machining the portion of tube and in a similar fashion to the section-by-section machining operation described above, the machining tool is rotated about an axis passing through the centre of the internal contour of the guide section and it is displaced until theoretically obtaining, for that guide section, a constant wall thickness which is at most equal to its minimum thickness.

By way of example, after having determined the characteristics of the successive control cross sections of the portion of tube, the arithmetic mean of the angles of orientation of the reference diameters of the successive control sections of the portion of tube is taken as the angle of orientation of the reference diameter of the guide section. The tube is so oriented that the reference diameter of the guide section is parallel to the direction of translatory movement of the assembly (axis of rotation of the tool-tool) and two sensors are brought into contact with the tube in a section forming the control section of the tube and in the preceding direction, the points of contact of which sensors then define the two ends of the reference diameter of the guide section of the portion of tube. The centre of the external contour of the guide section of the portion of tube is then defined as the middle of that reference diameter. The maximum and minimum thicknesses of the guide section are respectively defined as the arithmetic means of the maximum and minimum thicknesses of the successive sections. The centre of the internal contour of the guide section is located on the above-defined reference diameter, at a distance from the centre of the external contour which is equal to half the difference between the maximum and minimum thicknesses of the guide section in the direction of the end of the reference diameter corresponding to the smallest thickness of tube.

The characteristics of the guide section and the length of the portion of tube are introduced into the computing means of the machining bench. The tool is set rotating, the assembly (axis-tool) is so displaced that the axis of rotation passes through the centre of the internal contour of the guide section, and the tool is displaced radially to its cutting position, so as to obtain in respect of the guide section a constant wall thickness or gauge which is at most equal to its minimum thickness. Such setting of the tool remains the same while the tool carrier is displaced longitudinally along the portion of tube of which the periphery is thus machined.

At the end of the operation of machining the first portion of tube, the tool is moved away, the tool carrier is displaced to a position opposite the control section of the following portion and the same operations as for the previous portion of tube are repeated. The characteristics of the guide section of the following portion of tube are supplied to the machining bench, the orientation of the tube is modified in dependence on the direction of the reference diameter of the fresh guide section, and adjustment and displacement of the tool are determined by the characteristics of that guide section and the length of the portion of tube.

The invention also concerns the machine tool and the machining apparatus (comprising the control or checking equipment and the machine tool) which constitute means especially adapted to carrying out the process of the invention.

EMBODIMENT

The following example describes an apparatus for carrying out the process of the invention.

It essentially comprises an ultrasonic checking apparatus, a numerically controlled machine tool, an assembly for transfer of the tubes from the checking apparatus to the machine tool, and a data processing element for a dialogue between the checking apparatus and the machine tool, for automating the machining cycle.

Figure 1:
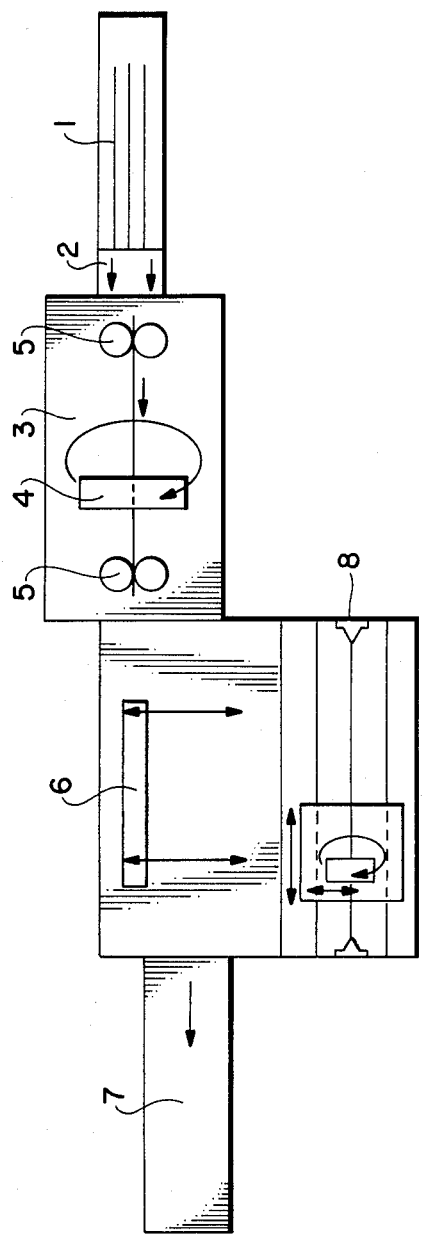
FIG. 1 is a diagrammatic view of the apparatus.
Figure 2:
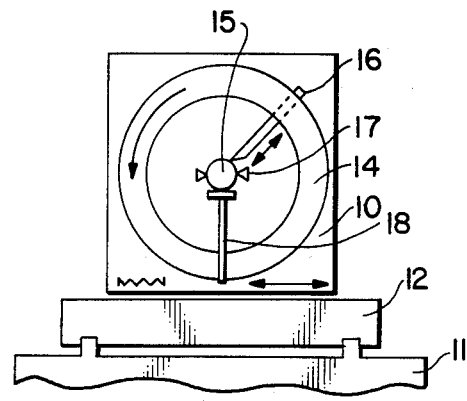
FIGS. 2 and 3 show an end view and plan view respectively of the machine tool.
Figure 3:
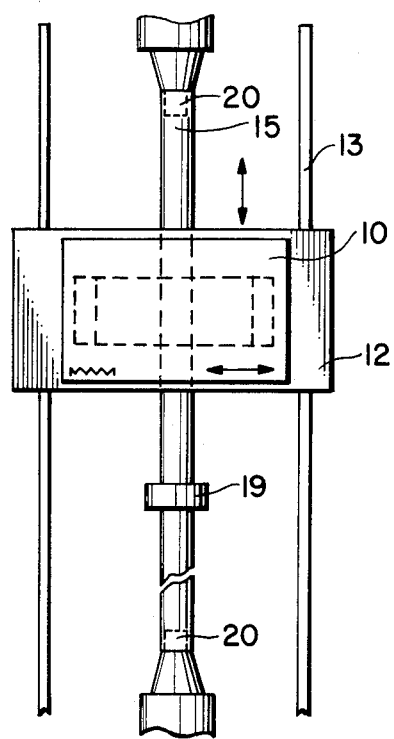

The checking or control machine or apparatus 3 comprises primarily an upstream storage table 1, a tube feed mechanism 2, a frame structure which carries the ultrasonic head 4, its control device, and the mechanism for entraining the tube with a translatory movement, which is formed by rollers 5 whose spacing is adjustable according to the diameter of the tube.

The transfer assembly 6 comprises primarily a mechanism for displacing the tube, which maintains the tube in its angular position (that is to say, its orientation with respect to its longitudinal axis) during displacement thereof, guide elements, a loading gantry on the machine tool, which also maintains the tube in its angular position, and a control apparatus. When the checking operation has shown that a tube does not need to be machined, the displacement mechanism passes it directly to the unloading channel or chute 7 of the machine tool, without it being taken up by the loading gantry of the machine tool. The tube is passed to the bench 11 of the machine tool 8, without any change in its angular position from its exit from the checking machine or apparatus 3, by the transfer gantry.

The machine tool 8 is designed for tubes of an external diameter of from 40 to 80 mm, an internal diameter of the order of from 25 to 55 mm and a length of from 2 to 6 meters. The tube 15 is then taken up between two hydraulically controlled expandable mandrels 20 which engage into the ends thereof and which can rotate synchronously for angularly positioning the tube. One of the mandrels is fixed, for the purposes of axial reference, while the other is adjustable on a longitudinal positioning slide.

The machining head 10 is disposed on the carriage 12 which is displaceable longitudinally on the bench 11, with a maximum travel of 6 meters. Such displacement, which is produced by a precision rack-and-pinion arrangement 13, permits the machining head to be positioned lengthwise of the tube 15, facing the section to be machined. The machining head 10 is capable of sliding transversely on the carriage 12. It carries the tool carrier ring 14 which surrounds the tube 15 and which rotates at a speed of 500 rpm. That arrangement permits transverse translatory movement of the axis of rotation of the tool for adjusting the position thereof with respect to the tube and for moving it so as to pass through the centre of the internal contour of the section to be machined.

The tool 16 is mounted on the ring 14 by way of a radial sliding device which makes it possible to adjust the distance of the cutting edge from the axis of rotation of the ring 14, that is to say, the radius of the circle described by the cutting edge of the tool.

The machining head 10 also carries a device for marking the ends of the reference diameter of the section in question, which comprises two feelers or sensors 17 which are disposed in diametrally opposite relationship and which are located in a plane parallel to the direction of transverse displacement of the machining head. Finally the machining head 10 carries abutments 18 for maintaining the precise position in respect of height of the tube 15 in the region of the section in question during the adjustment phase. The machining bench 11 also comprises a holding ring member 19 which can be taken out of its operative position but which serves to support the tube during the machining operation. It is set in position before the operation of machining each section.

The data processing system stores the dimensional data supplied by the checking element, together with the data supplied by the double-sensor marking apparatus, processes such data and supplies all the items of information resulting therefrom to the numerical control system of the machine tool which makes the necessary adjustments prior to each machining operation.

By way of example, tubes with an external diameter of 63.5 mm and a length of 5 meters are loaded on the storage table of the checking machine. Each tube is successively examined by the 4 transducer ultrasonic checking head while the tube is displaced longitudinally at a speed of 4 meters per minute. The data which are obtained in that fashion are, for each section of the tube, its distance from the starting end, the minimum thickness, the maximum thickness and the angle of the reference diameter of the section in question, to the reference diameter of the starting section.

If the degrees of eccentricity of all the sections checked are lower than the selected tolerance, the system "decides" that there is no need to machine the tube, and it passes it directly from the checking apparatus to the unloading channel. If that is not the case, the tube is taken by the transfer gantry in the angular position that it has on the checking apparatus, without that angular position being altered. One end is engaged on the fixed expandable mandrel and the movable expandable mandrel engages into the other end.

The machining head 10 is positioned in line with the section to be machined. By virtue of rotation of the mandrels, the tube is so oriented that the reference diameter is positioned facing the sensors, parallel to the direction of transverse translatory movement of the machining head.

The abutments 18 for vertical positioning of the tube, of which there are six, are raised to come into contact with the tube. The holder member 19 is moved to lock the tube in the position thereof. The abutments 18 are lowered to permit the machining tool 16 to pass. The tool being set in the position of maximum withdrawal from the tube, in order not to touch the tube at this stage, the tool carrier ring 14 is set rotating and will remain so until the end of the operation of machining the tube. Contact of the sensors 17 with the ends of the reference diameter having permitted the centre of the external contour to be determined, and that information having been supplied to the computing means with the elements coming from the checking machine, the machining head 10 is displaced transversely so that the axis of rotation of the tool carrier ring 14 passes through the centre of the internal contour of the section, the position of which was determined by the computing means.

The sensors 17 move away and the cutting edge of the tool 16 is progressively displaced radially. The cutting edge comes into contact with the tube when it is at a distance from the axis of rotation, that is equal to the outside radius of the tube corresponding to the point of maximum thickness. It begins to machine the external contour and its radial feed movement is stopped when it is at a distance from the axis of rotation, that is equal to the outside radius of the tube corresponding to the point of minimum thickness. Machining of the section in question being concluded, the tool withdraws radially to its maximum extent, to await the following machining operation, and the holder member 19 releases the tube.

That operation is repeated for all the sections which are to be machined.

When operating on a portion-by-portion basis, the longitudinal feed movement of the tool carrier is started when the tool begins machining the first section of the portion of tube, and stops when it arrives at the end of the portion of tube, the setting of the position of the tool being unaltered over the entire length of the portion of tube.

At the end of the tube machining operation, the holder member 19 is withdrawn, the movable mandrel moves away, the machining tool is disengaged, the fixed mandrel is released and the tube is discharged.

By way of indication, the time which elapses between the beginning of loading of a tube which is 5 meters long on the checking machine and the discharge thereof into the discharge channel after machining is of the order of 16.4 minutes for 100% machining on portions measuring 50 mm. The machine can deal with approximately 3.5 tubes per hour in the highly unfavourable situation in which all the sections have to be machined. The rate may rise to 10 tubes per hour when only a quarter of the sections exceeds the eccentricity tolerance and therefore requires machining.

One of the advantages of the equipment is precisely that, by virtue of the chart of the tube being established by the checking machine and by virtue of the integrated automatic devices, it makes it possible to machine only the sections which are in need of being machined, and to miss out those which are within the eccentricity tolerance. That, combined with the principle of producing different minimum dimensions from one section to another, permits a very substantial saving of material.

The process of the invention is typically applied to machining extruded and rolled tubes of zirconium alloy, with an external diameter of 30 to 110 mm, an internal diameter of from 15 to 75 mm, and a unit length of from 1 to 8 meters.

This process makes it possible to produce machined tubes or tubular parts, with a particularly low degree of relative eccentricity in every section, which does not exceed 1% in practice instead of about 3 to 5% as is achieved in known fashion. In regard to thin-wall tubes which are produced by rolling such tubes, that results in a similar reduction in the degree of eccentricity which, in the typical case of fuel sheath tubes, gives rise to an improvement in the quality and level of safety in operation, the minimum thickness of such tubes being increased for a given mean thickness.

We claim:

1. A process for machining a tubular part whose cross sections have circular internal and external circumferences, wherein the wall of said tubular part has an external circumference and an internal circumference which are not coaxial, resulting in varying wall thicknesses, comprising the steps of:
  (a) for a particular cross section, determining a reference diameter having one end at the tube surface at the point of maximum wall thickness and the other end at the tube surface at the point of minimum wall thickness, and determining the values of said maximum wall thickness and said minimum wall thickness;

(b) determining the position of the center of the external circumference by locating the middle of the reference diameter;

(c) determining the position of the center of the internal circumference on said reference diameter as spaced from the center of the external circumference in the direction of the minimum wall thickness by a distance equal to half of the difference between the maximum and minimum thicknesses;

(d) fixing said tubular part, and displacing a tool carrier carrying a rotatable machining tool in a direction parallel to the longitudinal axis of said tubular part until aligned with said cross-section, and displacing said tool carrier transverse to said longitudinal axis so that said tool may rotate about an axis passing through the center of said internal circumference;

(e) rotating said tool to describe a circle having as its center the center of said internal circumference at said cross-section, and radially displacing said tool in the direction of its axis of rotation to a desired depth of cut in the wall of said tubular part, and machining said wall until a desired substantially uniform wall thickness is obtained, said substantially uniform wall thickness being at most equal to said minimum wall thickness; and (f) removing said tool 2. A process according to claim 1 wherein after the tool is removed, steps (a) through (f) are repeated for another cross-section of said tubular part.

3. A process according to claim 1 or 2 wherein the dimensional characteristics of each section are supplied to the computing means of a numerically controlled machine tool which carries out the settings prior to each machining operation.

4. A process according to claim 1 or 2 wherein the tube is oriented about its longitudinal axis before the operation of machining in such a way that the reference axis of the section is parallel to the direction of transverse displacement of the carrier tool and carrier.

5. A process according to claim 4 wherein, after orientation of the tube, two sensors are brought into contact with the tube to determine the ends of the reference diameter.

6. A process according to claim 1 or 2 wherein the position and the thickness of the tube are continuously determined by means of an ultrasonic apparatus.

7. A process according to claim 6 wherein the maximum and minimum thicknesses and the position of the internal and external circumferences are determined by means of said ultrasonic apparatus.

8. A process for machining a tubular part according to claim 1 or 2, wherein said transverse displacement of said tool carrier and said radial displacement of said tool are maintained constant for a portion of the length of said part corresponding to several times the cutting width of said tool, comprising the steps of:

(a) attributing to said portion a constant guide section which is very close to the several successive cross sections of the portion;

(b) determining the characteristics of the guide section from the characteristics of said several successive sections; and (c) utilizing in machining an axis of rotation of the tool passing through the center of the internal circumference of the guide section, and the minimum wall thickness of said guide section as the maximum substantially uniform wall thickness after machining.

9. A process for machining a tubular part according to claim 8 comprising the following steps:

(a1) determining for each of the successive cross sections of one said portion, the positon of the ends of the reference diameter going from the point at which the wall thickness is at a minimum to the point at which the wall thickness is at a maximum, and the values of said maximum and minimum wall thicknesses, (b1) taking as the angle of orientation of the reference diameter of the guide section of the portion, the arithmetic mean of the angles of orientation of the reference diameters of the successive cross sections, (c1) orienting the tubular part in such a way that said reference diameter of the guide section is parallel to the direction of said transverse diplacement of said tool carrier, (d1) bringing into contact with the tubular part two sensors whose points of contact define the ends of the reference diameter of the guide section and determining the position of the center of the external circumference of the guide section as the middle of said reference diameter, (e1) defining the maximum and minimum thicknesses of the guide section respectively as the arithmetic means of the maximum thicknesses and the minimum thicknesses of the successive sections of the portion, (f1) determining the position of the center of the internal circumference of the guide section as being located on the reference diameter of said guide section, at a distance from the center of the external circumference that is equal to half the difference between the maximum and minimum thicknesses of the guide section in the direction of the end of the reference diameter corresponding to the smallest thickness of tubular part, (g1) fixing said tubular part, and displacing said tool in a direction transverse to the longitudinal axis of said part so that said tool rotates about an axis passing through the center of the internal circumference of the guide section, (h1) radially displacing the tool in the direction of its axis of rotation to a cutting position where for the guide section, a constant wall thickness which is at most equal to its minimum thickness may be obtained, (i1) machining said tubular part, while maintaining said radial setting of the tool and displacing the tool carrier longitudinally along the portion for machining thereof, and (j1) removing the tool.

10. A process for machining a tubular part according to claim 8 comprising the following steps:

(a2) determining for each of the successive cross sections of one said portion, the position of the ends of the reference diameter going from the point at which the wall thickness is at a minimum to the point at which the wall thickness is at a maximum, and the values of said maximum and minimum wall thicknesses, (b2) taking as the angle or orientation of the reference diameter of the guide section of the portion, the arithmetic mean of the angles of orientation of the reference diameters of the successive cross sections, (c2) orienting the tubular part in such a way that said reference diameter of the guide section is parallel to the direction of said transverse displacement of said tool carrier, (d2) bringing into contact with the tubular part two sensors whose points of contact define the ends of the reference diameter of the guide section and determining the position of the center of the external circumference of the guide section as the middle of said reference diameter, (e2) defining the maximum and minimum thicknesses of the guide section respectively as the arithmetic means of the maximum thicknesses and the minimum thicknesses of the successive sections of the portion, and (f2) computing the difference between said maximum and minimum thicknesses of the guide section, and comparing said difference with a predetermined eccentricity tolerance.

11. A process for machining a tubular part according to claim 10, wherein said difference is less than or equal to said eccentricity tolerance, and no subsequent machining is performed on said portion.

12. A process for machining a tubular part according to claim 10, wherein said difference is greater than said eccentricity tolerance, and the following steps are subsequently carried out:

(g2) determining the position of the center of the internal circumference of the guide section as being located on the reference diameter of said guide section, at a distance from the center of the external circumference that is equal to half the difference between the maximum and minimum thicknesses of the guide section in the direction of the end of the reference diameter corresponding to the smallest thickness of tubular part, (h2) fixing said tubular part, and displacing said tool in a direction transverse to the longitudinal axis of said part so that said tool rotates about an axis passing through the center of the internal circumference of the guide section.

(i2) radially displacing the tool in the direction of its axis of rotation to a cutting position where, for the guide section, a constant wall thickness which is at most equal to its minimum thickness may be obtained, (j2) machining said tubular part, while maintaining said radial setting of the tool and displacing the tool carrier longitudinally along the portion for machining thereof, and (k2) removing the tool.

* * * * *